Dec. 27, 1966  C. R. BARNES ETAL  3,294,059
DEPOSITION OF NICKEL FILMS ON THE INTERIOR SURFACE
OF POLYTETRAFLUOROETHYLENE TUBING
Filed April 15, 1963
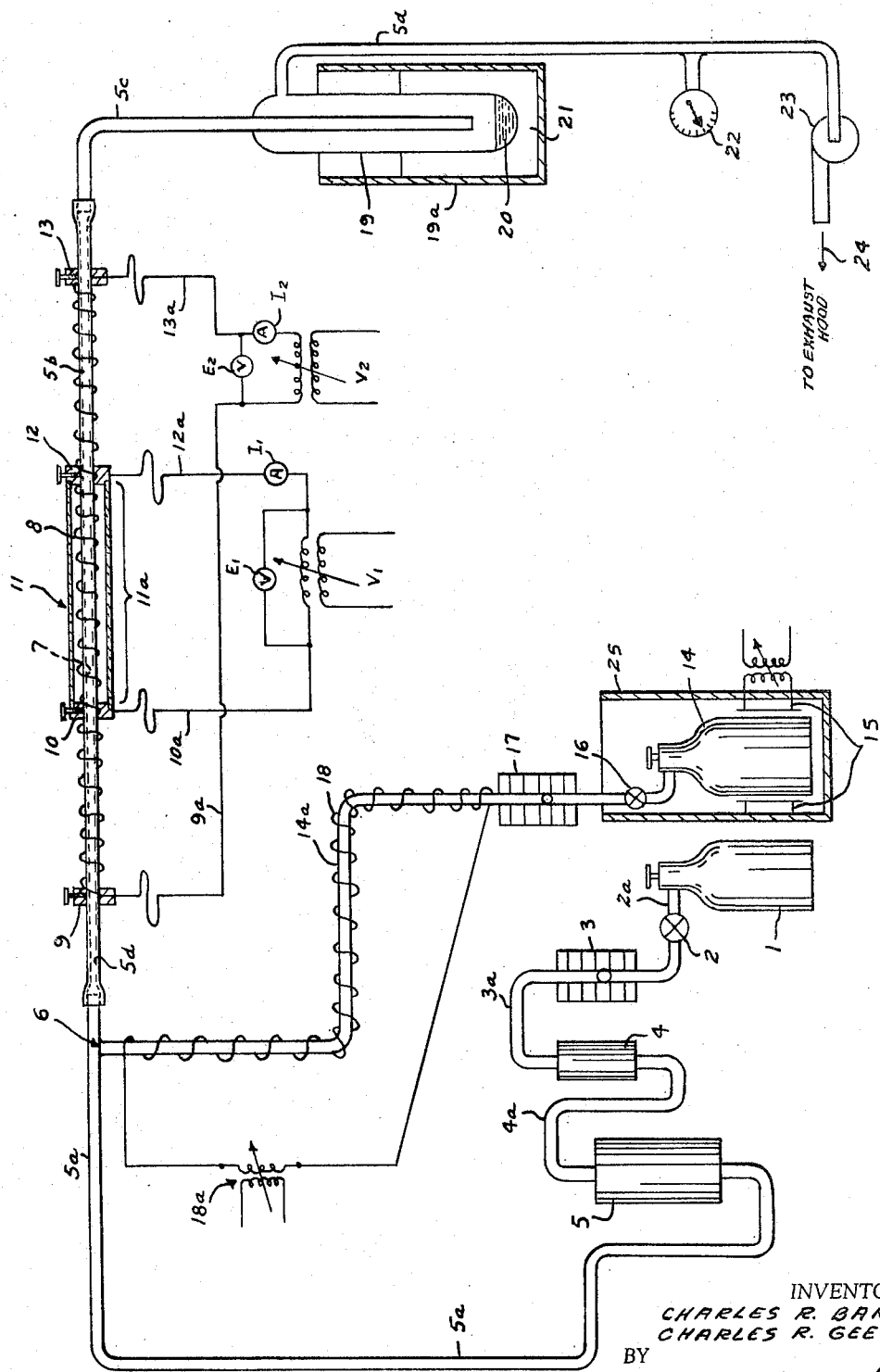
INVENTORS
CHARLES R. BARNES
CHARLES R. GEESNER
BY
Wade Loomis
Charles H. Wagner
ATTORNEYS United States Patent Office 3,294,059
Patented Dec. 27, 1966

3,294,059
DEPOSITION OF NICKEL FILMS ON THE INTERIOR SURFACE OF POLYTETRAFLUOROETHYLENE TUBING
Charles R. Barnes, Medway, and Charles R. Geesner, New Carlisle, Ohio, assignors to the United States of America as represented by the Secretary of the Air Force
Filed Apr. 15, 1963, Ser. No. 273,248
2 Claims. (Cl. 118—49.5)

The invention described herein may be manufactured and used by or for the United States Government for governmental purposes without payment to us of any royalty thereon.

This invention relates to a method and means for plating the interior of flexible plastic tubing and has for an object the method of forming tubular thin films of nickel inside of Teflon (polytetrafluoroethylene) or other flexible plastic tubing by plating the interior surface thereof by pyrolytic decomposition of nickel carbonyl vapor in a partial vacuum within the tubing.

A further object is the method of depositing nickel in a smooth and uniform manner on the interior surface of Teflon or similar flexible tubing to provide a flexible tubular conductor for use in such applications as plastic wave guides, flexible coaxial cables, light pipes, and conductors for use in bionics, and aerospace research.

A further object of the invention includes an improved method and apparatus for depositing a uniform thin flexible film of nickel on the inner surface of polytetrafluoroethylene or similar flexible tubing.

Other objects and advantages of the invention will become apparent from the following description and accompanying drawing which schematically shows an improved apparatus for carrying out the improved method or process for plating the interior surface of Teflon tubing with nickel.

In the drawing, the reference numeral 1 denotes a hydrogen gas cylinder having an outlet control valve 2 in an outlet conduit 2a connected to a flow meter 3 from which a conduit 3a leads to deoxidizer 4 having an outlet conduit 4a leading to a molecular sieve drier 5 having an outlet conduit 5a to which is suitably connected a polytetrafluoroethylene flexible tubing 7 hereinafter referred to as "Teflon," the inner surface of which is to be coated with a film of nickel.

The Teflon tubing 7 is surrounded by an electrical heating coil 8 with its ends connected to adjustable, preferably metal, clamps 9, 10, 12 and 13, connected to suitable heating circuits, later to be described.

Surrounding the Teflon tubing in spaced relation and extending between the clamps 10 and 12 is a Pyrex glass enclosure tube 11. The space between the clamps 10 and 12 constitutes a higher temperature heating and plating zone and the glass tubing 11 surrounds the heating coil 8 with the clamps 10 and 12 establishing electrical contact with the electrical heating coil 8 at the opposite ends of this heating zone and plating zone, which is enclosed by the glass cylinder 11 being indicated at 11a.

Electrical conductors 9a and 13a respectively connect the opposite ends of the heating coil 8 through the clamps 9 and 13, the other ends of the electrical connectors 9a and 13a being connected to a variable transformer or variac $V_2$ having a suitable volt meter $E_2$ and ammeter $I_2$ for determining value of current in the circuit, current being supplied to the transformer $V_2$ from a suitable electrical source.

A second variable transformer or variac $V_1$ supplies current to the contact clamps 10 and 12, in contact with the portion of the heating coil located within the glass tube 11, through the conductors 10a and 12a, the circuit being provided with current measuring means such as volt meter and ammeter means indicated respectively at $E_1$ and $I_1$.

Nickel carbonyl gas is supplied from a cylinder 14 through a delivery conduit 14a having a flow control valve 16 therein, the conduit 14a passing through a flow meter 17. The conduit 14a is connected in communication with the hydrogen supply conduit 5a, as indicated at the juncture 6.

An electrical resistance heating tape 18 surrounds the $Ni(CO)_4$ supply conduit 14a intermediate the flow meter 17 and the juncture 6, current being supplied thereto through a suitable control or variable transformer 18a or other means from a suitable electrical source.

The Teflon tubing to be nickel coated interiorly, as indicated at 5b, is suitably connected at one end to the conduit 5a between the juncture 6 and the clamp member 9, the other end of the tubing 5b being connected beyond the clamp 13 to a downwardly extending conduit or pipe 5c which extends into a cold trap 19 having an outlet or suction conduit 5d, which is connected to a suitable vacuum pump 23, the vacuum pump having an outlet orifice 24 which may be connected to a suitable gas or fumes disposal hood (not shown).

The cold trap 19 is surrounded by a container 19a containing liquid nitrogen, indicated at 21, to freeze down any undecomposed nickel carbonyl and carbon monoxide poisonous vapors in the area 20, cooled by the liquid nitrogen in the container 19a. A vacuum gauge 22 is connected to the pipe 5d to measure the degree of vacuum created by the vacuum pump 23.

The cylinder 14 containing the nickel carbonyl gas (under pressure) is preferably surrounded by a closed receptacle or cabinet 25 which carries suitable strip heaters 15 extending longitudinally along the sides of the cylinder 14. These heaters may be of the electrical resistance types connected to a variably controlled suitable electrical source (not shown) for maintaining the temperature at approximately 34° C.

Before starting the plating process the vacuum pump 23 is turned on and the Teflon tubing 5b is evacuated for at least twenty minutes so as to remove absorbed gases from its internal surface. During this exhausting treatment the temperature of the Teflon is elevated to 100° C. for this twenty-minute period. This is accomplished by the adjustment of the variable transformer $V_2$.

After the exhaustion of vapors from within the tubing 5b is completed the temperature of the plating zone 11a is adjusted to 90° C. by regulating the setting of the variac $V_1$. At the same time, that portion of the Teflon tubing between the clamps 9 and 10 is adjusted to approximately 34° C. which can be accomplished by the adjustment of the variac $V_2$. Also the temperature of the nickel carbonyl cylinder 14 and the temperature of its delivery line is maintained at 34° C. by the electrical strip heaters 15 and the electrical heating tape 18 respectively.

The purpose of the 34° C. temperature control is so that the nickel carbonyl, whose boiling point is 34° C., may be delivered from the cylinder 14 into the plating zone under the clamp 10 in the form of vapor.

To start the plating process, the valves 2 and 16 are slightly opened so that about two milliliters each of hydrogen gas from cylinder 1 and nickel carbonyl gas from cylinder 14 flow through the flowmeters 3 and 17, respectively, the hydrogen gas being de-oxidized by passing through the de-oxidizer 4 and then dried by flowing through the molecular sieve drier 5. The flow meter 3, de-oxidizer 4 and drier 5 may be conventionally well known commercial devices and the specific details thereof are not shown nor are these details of particular importance to the invention.

The two gases ($H_2$ and $Ni(CO)_4$) are mixed at the juncture 6 and flow together at 34° C. into the Teflon tubing 5b between the clamps 9 and 10 into the plating zone 11a between the clamps 10 and 12 where the temperature on the internal surface of the Teflon tube is 90° C. and its internal pressure is approximately two millimeters of mercury, as indicated by the vacuum gauge 22, since the vacuum pump 23 is still running.

At this temperature and pressure a bright film of nickel is plated on the internal surface of the Teflon tubing 7 from clamps 10 to 12, which are placed about four inches apart and in contact with the heating coil 8 in order to maintain the temperature in the heating zone at 90° C.

The Pyrex glass tubing 11 surrounding the plating zone and heating zone and the heating coil 8 provides means for maintaining the temperature (90° C.) even and uniform throughout the length of the plating zone 11a during the plating process.

After the nickel film has reached a thickness of approximately 0.3 mil, which requires about four minutes, the plating zone is moved or advanced to the left. This is accomplished by loosening and moving the two clamps 10 and 12, as well as the Pyrex glass cover or enclosure tube 11 along the tubing 5b and the heating coil 8. The glass tube 11 and the two electrical contact clamps 10 and 12 may be and preferably are fixed together to move as a unit along the tubing 5b and the heating coil 8.

This operation is continued until as much of the Teflon tubing is plated on its internal surface with nickel as desired. Any decomposed nickel carbonyl and carbon monoxide poisonous vapors leaving the Teflon tubing are cooled by the liquid nitrogen 21 in the cold trap 19, while the other vapors such as hydrogen escape at 24 by reason of the vacuum pump 23, into a suitable collector or disposal hood, not shown.

By employing the process the interior surface of a section of Teflon tubing three millimeters inside diameter and two feet in length has been actually plated with a satisfactory conductive film of nickel. However, the process is not limited to the above dimensions of Teflon tubing, but larger or smaller tubing may be plated as desired. Also, the plating method or process is not particularly limited to Teflon, but is applicable to other plastic, metal, or ceramic tubing, providing that such tubing is not deteriorated by a temperature of 90° C.

For the purpose of exemplification, a particular embodiment of the invention has been shown and described to the best understanding thereof. However, it will be apparent that minor changes and modifications in the arrangement and construction of the parts thereof may be resorted to without departing from the spirit and scope of the invention as defined in the following claims.

We claim:

1. An apparatus for plating the inner surface of flexible plastic tubing such as tetrafluoroethylene tubing with a coating of nickel which comprises, a source of hydrogen gas under pressure, a source of nickel carbonyl gas under pressure, a hydrogen gas delivery conduit connected to said hydrogen gas source having a flow meter, a de-oxidizer, and a drier therein, valve means for controlling the discharge of hydrogen gas from said source of hydrogen gas into said hydrogen gas delivery conduit at a predetermined low pressure, a nickel carbonyl gas delivery conduit from said nickel carbonyl gas source connected to said hydrogen gas delivery conduit having a flow meter therein, nickel carbonyl gas control valve means in said nickel carbonyl gas delivery conduit for controlling flow of said nickel carbonyl gas at a predetermined low pressure into said hydrogen gas delivery conduit, electric heater means surrounding said nickel carbonyl gas delivery conduit and said nickel carbonyl gas source, adjustable for heating said nickel carbonyl gas source and said nickel carbonyl gas delivery conduit to a uniform temperature of about 34° C., means for connecting a length of tubing to be plated interiorly with nickel adapted to be connected at one end to said hydrogen gas delivery conduit, downstream from the juncture of said nickel carbonyl gas conduit therewith, electrical heating coil means adapted to surround the plastic tubing to be internally plated, to extend substantially from end to end thereof, a regulated electrical source connected to the opposite ends of said surrounding heating coil for maintaining the tubing to be internally plated at a temperature of 34° C. during the internal plating thereof, an elongated electrically nonconductive tubular heat confining member concentrically surrounding said electrical heating coil and the plastic tubing to be plated to enclose a predetermined length of said heating coil and tubing intermediate the ends thereof, adjustable axially along the tubing and said surrounding heating coil, electrical conductor means fixed at each end of said tubular heat confining member establishing electrical contact with said surrounding electrical heating coil at the opposite ends of said tubular heat confining member, second regulated electrical source connected to said last conductor means for maintaining the temperature in a plating zone within said nonconductive tubular heat confining member substantially uniform between the ends thereof at 90° C., a discharge conduit adapted to be connected to the opposite end of the plastic tubing to be internally plated, a vacuum pump connected to the discharge end of said discharge conduit for maintaining a partial vacuum in said discharge conduit and in the tubing to be plated of substantially two millimeters of mercury during the internal plating thereof, and a cold trap in said discharge conduit adapted to contain a low temperature liquid such as liquid nitrogen for freezing down any undecomposed vapors such as nickel carbonyl vapors and carbon monoxide vapors passing thereinto from said plating zone to said vacuum pump.

2. An apparatus for plating the inner surface of the flexible plastic tubing as claimed in claim 1, including electroconductive clamp means fixed to the opposite ends of said nonelectroconductive tubular heat confining means closing said ends connected to said clamp means and to said second regulated electrical source for establishing electrical contact with said electrical heating coil means for surrounding said tubing to be internally plated at opposite ends of said tubular heat confining member when said tubular heat confining means is adjusted to different positions along said heating coil and the tubing when surrounded by the heating coil, for plating different longitudinally disposed interior portions of the tubing, and utilizing the same heating coil to surround said plastic tubing for maintaining the substantially uniform 34° C. temperature on the end portions of the plastic tubing beyond the tubular heat confining means and provide the increased 90° C. temperature in the plastic tubing portion located within the tubular heat confining means between the opposite ends thereof.

(References on following page)

References Cited by the Examiner

UNITED STATES PATENTS

| | | | |
|---|---|---|---|
| 2,332,309 | 10/1943 | Drummond | 117—107.2 X |
| 2,562,182 | 7/1951 | Godley | 117—47 X |
| 2,685,124 | 8/1954 | Toulmin | 117—107.2 X |
| 2,729,190 | 1/1956 | Pawlyk | 118—48 |
| 2,872,342 | 2/1959 | Nack | 117—107.2 X |
| 2,897,091 | 7/1959 | Homer et al. | 117—47 |
| 2,985,509 | 5/1961 | Breining et al. | 117—107.2 X |
| 3,031,338 | 4/1962 | Bourdeau | 117—107.2 X |
| 3,163,733 | 12/1964 | Ostropky et al. | 117—107.2 X |

OTHER REFERENCES

Nack, "Metallizing of Plastics," Reinhold Publishing Co., N.Y., pp. 44, 45 relied on.

RALPH S. KENDALL, *Primary Examiner.*

MURRAY KATZ, ALFRED L. LEAVITT, *Examiners*

A. GOLIAN, *Assistant Examiner.*